(12) United States Patent
Pan et al.

(10) Patent No.: US 12,471,241 B2
(45) Date of Patent: Nov. 11, 2025

(54) POWER SUPPLY FOR COMPUTER

(71) Applicant: CHANNEL WELL TECHNOLOGY CO., LTD., Taoyuan (TW)

(72) Inventors: Yen-Cheng Pan, Taoyuan (TW); Bo-Lun Lin, Taoyuan (TW)

(73) Assignee: CHANNEL WELL TECHNOLOGY CO., LTD., Taoyuan (TW)

( * ) Notice: Subject to any disclaimer, the term of this patent is extended or adjusted under 35 U.S.C. 154(b) by 260 days.

(21) Appl. No.: 18/489,030

(22) Filed: Oct. 18, 2023

(65) Prior Publication Data

US 2025/0093924 A1    Mar. 20, 2025

(30) Foreign Application Priority Data

Sep. 18, 2023    (TW) .................................. 112135520

(51) Int. Cl.
*H05K 7/20* (2006.01)
*G06F 1/26* (2006.01)

(52) U.S. Cl.
CPC ........... *H05K 7/20172* (2013.01); *G06F 1/26* (2013.01)

(58) Field of Classification Search
CPC .................................................. H05K 7/20172
See application file for complete search history.

(56) References Cited

U.S. PATENT DOCUMENTS

| 7,715,179 | B2 * | 5/2010 | Wang | G06F 1/26 345/157 |
| 11,531,384 | B1 * | 12/2022 | Pan | G06F 1/20 |
| 2010/0284149 | A1 * | 11/2010 | Su | H05K 7/20909 361/695 |

\* cited by examiner

*Primary Examiner* — Mukundbhai G Patel

(57) ABSTRACT

A power supply for a computer includes a base component, a top cover component and a fan component. The base component includes a bottom wall and two first direction side walls. The two first direction side walls are parallel to each other, and respectively connected to two ends of a first direction of the bottom wall. Each first direction side wall has two first extending portions, and the first extending portions extend along the first direction. The top cover component includes a top wall and two second direction side walls. The two second direction side walls are parallel to each other, and respectively connected to two ends of a second direction of the top wall, and respectively cover the first extending portions. The second direction is perpendicular to the first direction, and the first direction and the second direction are parallel to the bottom wall and the top wall.

8 Claims, 3 Drawing Sheets

POWER SUPPLY FOR COMPUTER

CROSS-REFERENCE TO RELATED APPLICATION

This non-provisional application claims priority under 35 U.S.C. § 119 (a) on Patent Application No(s). 112135520 filed in Taiwan, R.O.C. on Sep. 18, 2023, the entire contents of which are hereby incorporated by reference.

BACKGROUND OF THE INVENTION

1. Field of the Invention

The present disclosure relates to a power supply, and in particular to a power supply for a computer.

2. Description of the Related Art

A power supply for a computer can transform and rectify AC power for providing power to a hard disk, an optical drive, and a motherboard in the computer. The computer power supply typically includes a circuit board, electronic elements mounted on the circuit board, and a cooling fan. These elements are usually locked in a housing using screws, therefor resulting in the housing of the power supply being covered with exposed locking screws.

One disadvantage of the exposed locking screws is the lack of aesthetics, which may lead to a decrease in a consumer's desire to purchase, and may also cause discomfort to users. Another disadvantage is that the exposed locking screws affect the flatness of the housing, causing excessive friction and tremors when the power supply is installed in the card slot of the computer host, which affects the quality of the installation.

BRIEF SUMMARY OF THE INVENTION

Therefore, in order to overcome the disadvantages of the conventional computer power supply, the present disclosure provides a power supply for a computer that reduces the number of exposed screws.

To achieve the above objective and other objectives, the present disclosure provides a power supply for a computer, including a base component, a top cover component, and a fan component. The base component comprises a bottom wall and two first direction side walls. The two first direction side walls are parallel to each other, and are respectively connected to two ends of a first direction of the bottom wall. Each first direction side wall has two first extending portions, and the first extending portions extend along the first direction. The top cover component comprises a top wall and two second direction side walls. The two second direction side walls are parallel to each other, and are respectively connected to two ends of a second direction of the top wall, and respectively cover the first extending portions. The second direction is perpendicular to the first direction, and the first direction and the second direction are parallel to the bottom wall and the top wall. The fan component comprises a fan body and a plurality of fan connectors. The fan body is located in a space formed by clamping the base component and the top cover component. The plurality of fan connectors is respectively connected to the fan body and one of the first extending portions.

In an embodiment of the present disclosure, the fan connector has two fan locking parts, and the two fan locking parts are respectively parallel to the top wall and the first extending portion to respectively lock in the fan body and one of the first extending portions.

In an embodiment of the present disclosure, the top wall has a plurality of vent holes, and the fan body is adjacent to the top wall.

In an embodiment of the present disclosure, the power supply further includes an electrical connection interface, disposed in one of the two first direction side walls.

In an embodiment of the present disclosure, the first direction sidewall has a plurality of vent holes.

In an embodiment of the present disclosure, the power supply further includes a circuit component, including a circuit board, a support plate, and a plurality of support plate connectors. The circuit board is locked to the support plate, and the support plate connectors are respectively connected to the support plate and one of the first extending portions.

In an embodiment of the present disclosure, the support plate is provided with a plurality of nut posts, and the circuit board is locked to the support plate via the nut posts.

In an embodiment of the present disclosure, the support plate connectors are parallel to the first extending portion, and are respectively locked to the first extending portions.

Accordingly, the power supply for a computer of the present disclosure covers the first extending portion through the top cover component, so that a plurality of screw holes located on the first extending portion are hidden. Thus, the housing body may use a smooth, flat surface to move in the first direction (such as for installation) in contact with other devices, and can move smoothly, avoiding excessive friction or tremor, providing excellent installation quality, and has a more aesthetic appearance, and reducing the possibility of causing user discomfort.

DETAILED DESCRIPTION OF THE INVENTION

Figure 1:
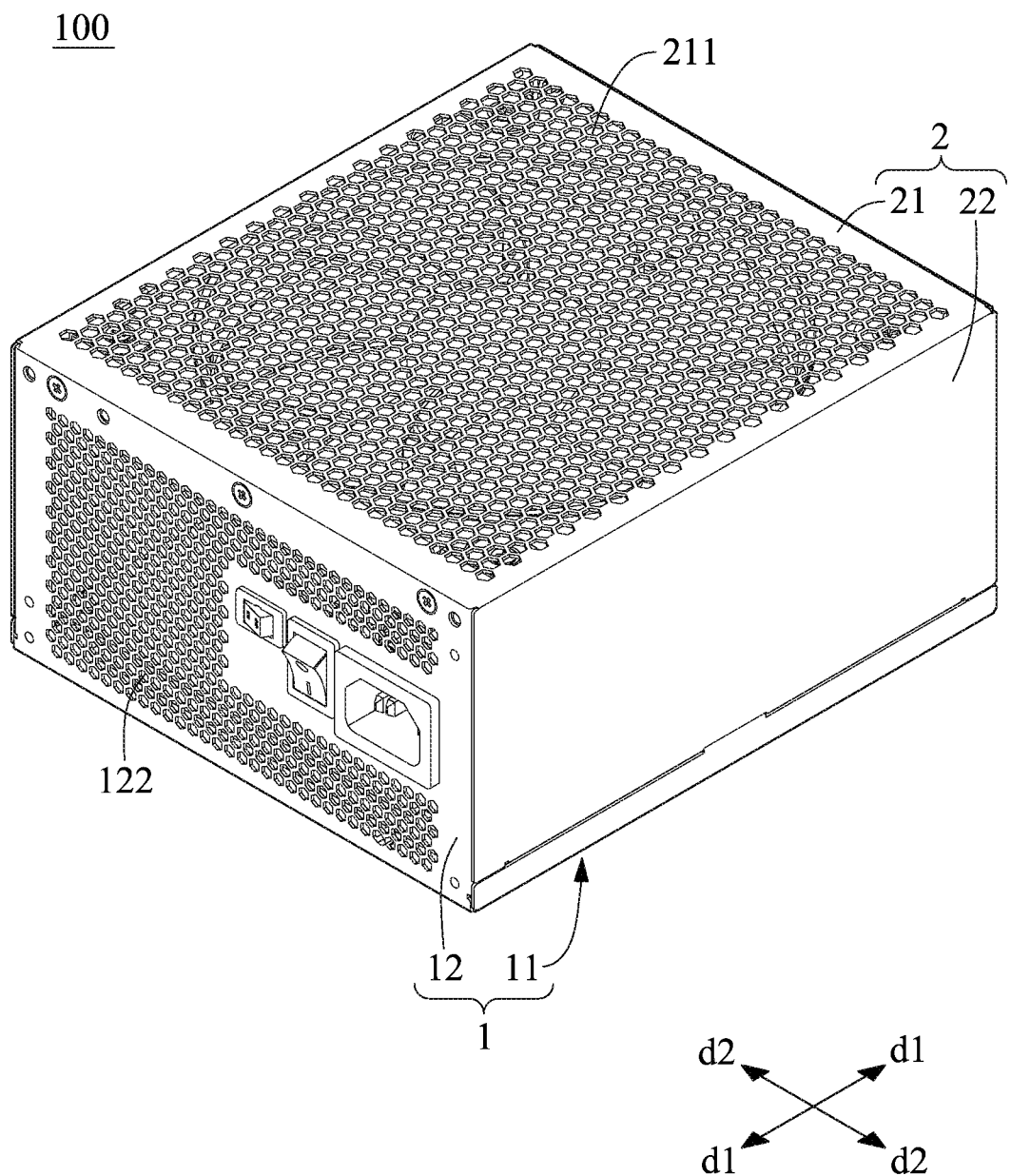
FIG. 1 is a perspective view of a power supply for a computer according to an embodiment of the present disclosure.
Figure 2:
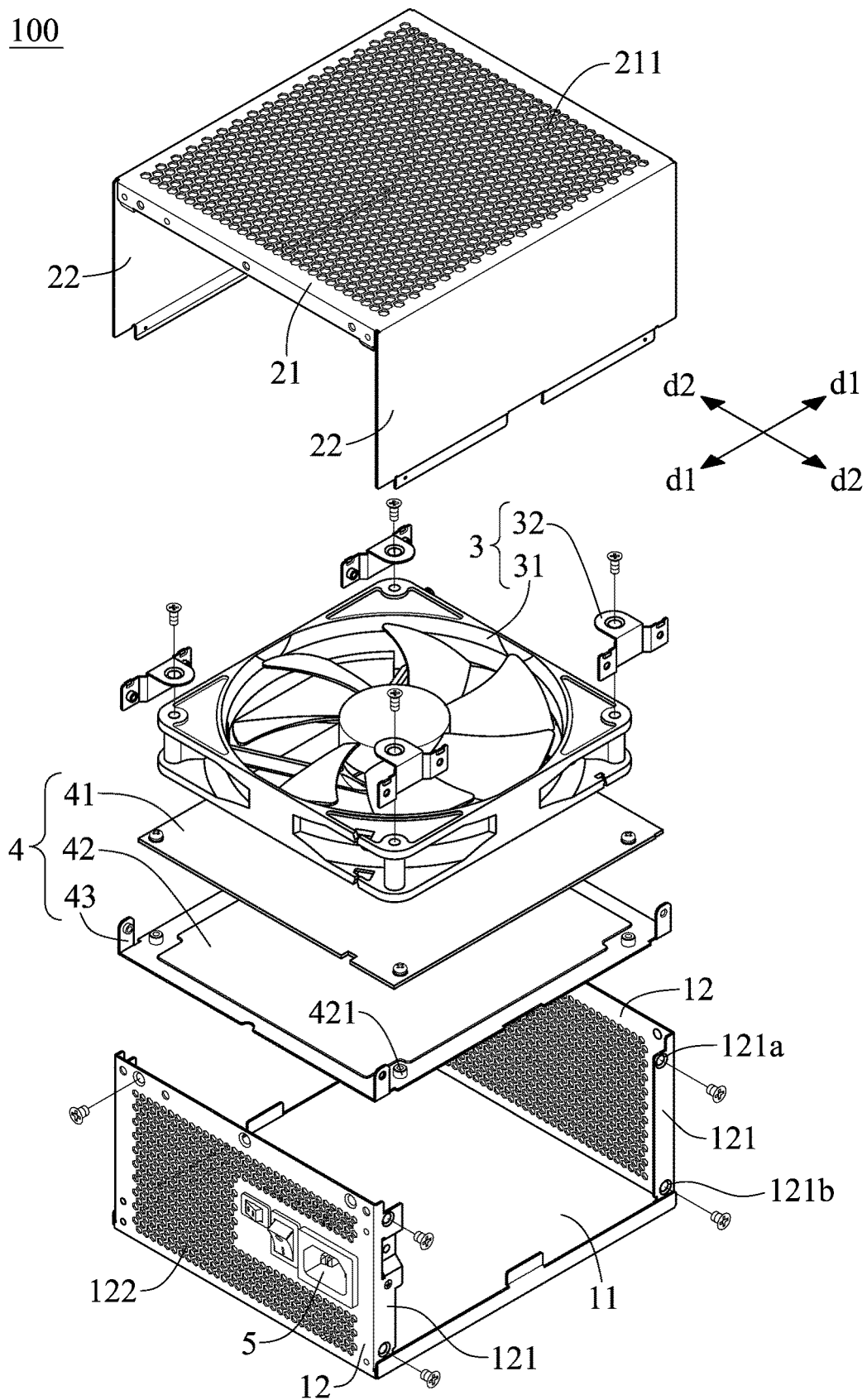
FIG. 2 is an exploded view of the power supply for a computer according to an embodiment of the present disclosure.

To facilitate understanding of the present disclosure, the following specific embodiments together with the attached drawings for the detailed description of the present application are provided. One skilled in the art can understand the object, characteristics, and effects of this present disclosure by the content described in the specification. It should be noted that various possible modifications and alterations to the details of the specification could be carried out by implementing or applying other different embodiments based on different views and applications without departing from the spirit of the present application. The related technical contents of the application will be described in detail by the embodiments. However, the disclosed contents should not be considered to limit the scope of the present application. The description is provided as follows:

As shown in FIGS. 1 and 2, a power supply 100 for a computer in an embodiment of the present disclosure includes: a base component 1, a top cover component 2, and a fan component 3.

The base component 1 includes a bottom wall 11 and two first direction side walls 12. The two first direction side walls 12 are parallel to each other, and respectively connected to two ends of a first direction d1 of the bottom wall 11. Each first direction side wall 12 has two first extending portions 121, and the first extending portions 121 extend along the first direction d1.

The top cover component 2 includes a top wall 21 and two second direction side walls 22. The two second direction side walls 22 are parallel to each other, and respectively connected to two ends of a second direction d2 of the top wall 21, and respectively cover the two first extending portions 121. Among them, the top wall 21 and the bottom wall 11 are parallel to each other, the second direction d2 is perpendicular to the first direction d1, and the first direction d1 and the second direction d2 are parallel to the bottom wall 11 and the top wall 21. That is, the base component 1 and the top cover component 2 cooperate with each other to form a hollow hexahedral structure.

The fan component 3 includes a fan body 31 and a plurality of fan connectors 32. The fan body 31 is located in a space formed by clamping the base component 1 and the top cover component 2, preferably close to the top wall 21 to blow airflow from vent holes 211 of the top wall 21. The plurality of fan connectors 32 are respectively connected to the fan body 31 and one of the first extending portions 121 to fix the fan body 31 to the first extending portion 121. In detail, in an embodiment, the number of fan connectors 32 is provided as four, they respectively correspond to the first extending portion 121 located at each two sides of the two first direction side walls 12, and locked to a locking hole 121a of the first extending portion 121 by screws or other locking pieces. The position and height of the locking hole 121a may be changed accordingly as necessary to change the position of the fan body 31 fixed at the first extending portion 121.

By the above structure, when assembled, the fan body 31 is locked to the locking hole 121a of the first extending portion 121 by the fan connector 32, and the fan body 31 can be fixed. At this time, the screw connection of the fan connector 32 is located on the first extending portion 121, and then the two second direction side walls 22 of the top cover component 2 cover these first extending portions 121, so that the screw connection of the fan connector 32 is hidden (as shown in FIG. 1). Thus, the housing body of the power supply 100 for a computer of the present disclosure may have a smooth, flat surface to move in the first direction d1 (such as for installation) in contact with other devices, and can move smoothly, avoiding excessive friction or tremor, providing excellent installation quality, and has a more aesthetic appearance, reducing the possibility of causing user discomfort.

Figure 3:
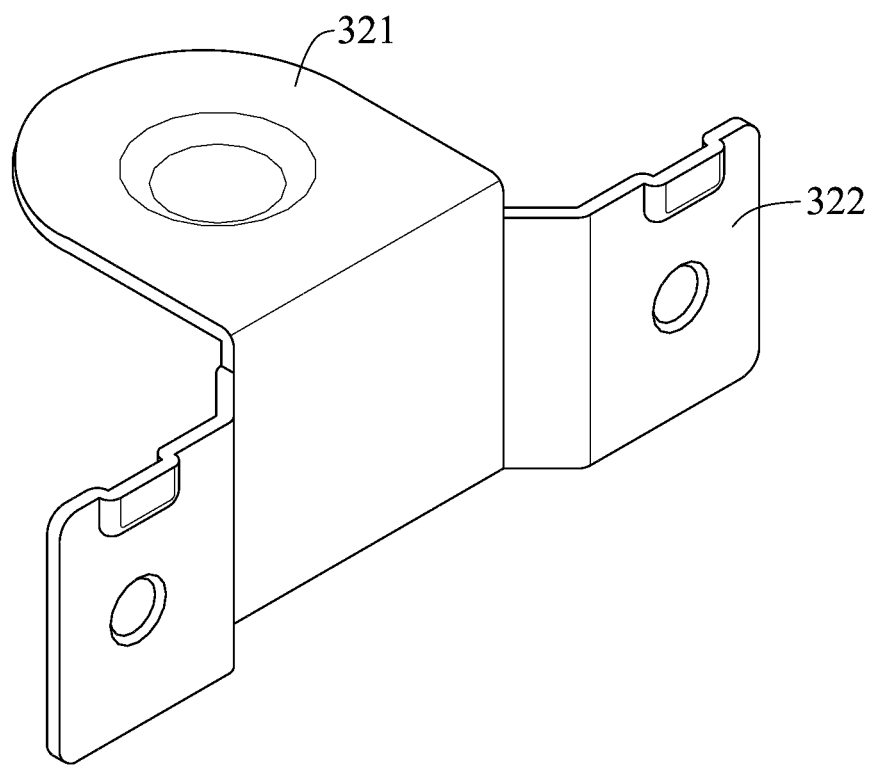
FIG. 3 is a perspective view of fan locking parts according to an embodiment of the present disclosure.

Further, in an embodiment, as shown in FIG. 3, the fan connector 32 has two fan locking parts 321, 322. The two fan locking parts 321, 322 are respectively parallel to the top wall 21 and the first extending portion 121 to respectively lock in the fan body 31 and one of the first extending portions 121. In detail, the fan locking part 321 is parallel to the top wall 21, and is locked to the fan body 31 by screws or other locking pieces. The fan locking part 322 is parallel to the first extending portion 121, and is locked to one of the locking holes 121a of the first extending portion 121 by screws or other locking pieces. Preferably, the fan locking parts 322 of each fan connector 32 may be symmetrically provided as two sets, in order to flexibly select one of the fan locking parts 322 for locking.

Further, in an embodiment, the top wall 21 has the aforementioned plurality of vent holes 211. The fan body 31 is adjacent to the top wall 21, in order to blow airflow via the vent holes 211 nearby.

Further, in an embodiment, as shown in FIG. 2, the power supply 100 for a computer further includes a circuit component 4. The circuit component 4 includes a circuit board 41, a support plate 42, and a plurality of support plate connectors 43. For ease of understanding, the electronic elements and other conventional machine core structures on the circuit board 41 are omitted in the figures. The circuit board 41 is locked to the support plate 42 by screws or other locking pieces, and is supported by the support plate 42. The support plate 42 has better rigidity than that of the softer circuit board 41, and is usually a thin metal board. The plurality of support plate connectors 43 are respectively connected to the support plate 42 and one of the plurality of first extending portions 121. In detail, in an embodiment, the number of support plate connectors 43 is provided as four (the actual number may vary depending on demand), and they are respectively corresponded to the first extending portion 121 located at each two sides of the two first direction side walls 12, and locked to a locking hole 121a of the first extending portion 121 by screws or other locking pieces. The position and height of the locking hole 121a may be changed accordingly as necessary to change the position of the fan body 31 fixed at the first extending portion 121. Generally, the height position of the locking hole 121b is closer to the bottom wall 11, and the height position of the locking hole 121a is closer to the top wall 21, but the present disclosure is not limited thereto.

When assembled, the circuit board 41 is locked to the support plate 42 by screws or other locking pieces, and the support plate connectors 43 are locked to the locking holes 121b of the first extending portions 121 (the above two steps are in no particular order), and the circuit board 41 can be fixed. At this time, the screw connections of the circuit board 41 are located on the support plate 42 and it is difficult to observe from the appearance of the power supply 100 for the computer. Since the screw connections of the support plate connectors 43 are located on the first extending portions 121, and then the two second direction side walls 22 of the top cover component 2 cover these first extending portions 121, so that the screw connections of the support plate connector members 43 are hidden (as shown in FIG. 1). Thus, the housing body of the power supply 100 for a computer of the present disclosure may use a smooth, flat surface to move in the first direction d1 (such as for installation) in contact with other devices, and can move smoothly, avoiding excessive friction or tremor, providing excellent installation quality, and has a more aesthetic appearance, reducing the possibility of causing user discomfort.

Further, in an embodiment, the power supply 100 for a computer further includes an electrical connection interface 5, disposed in one of the two first direction side walls 12. The electrical connection interface 5, for example, is a power switch or power socket, etc., electrically connected to the circuit board 41 and/or the fan body 31. Since the first direction side wall 12 is generally not provided as a moving contact surface, the electrical connection interface 5 that has an undulating surface is suitable for being disposed on the first direction side wall 12, and not suitable for the second direction sidewall 22 requiring a smooth, flat surface.

Further, in an embodiment, the first direction sidewall 12 also has a plurality of vent holes 122. The airflow generated by the fan body 31 may also flow out from the vent holes 122, and remove the thermal energy generated by the circuit board 41.

Further, as shown in FIG. 2, in an embodiment, the support plate 42 is provided with a plurality of nut posts 421, and the circuit board 41 is locked to the support plate 42 via these nut posts 421. The number of nut posts 421 is not limited, and the number provided in an embodiment is four, and they are provided at four corners of the support plate 42.

Further, as shown in FIG. 2, in an embodiment, the plurality of support plate connectors 43 are parallel to the first extending portions 121, and are respectively locked to these first extending portions 121. However, the present disclosure is not limited thereto, and the support plate connector 43 may have other types.

While the present invention has been described by means of preferable embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A power supply for a computer, comprising:
a base component, comprising a bottom wall and two first direction side walls, the two first direction side walls are parallel to each other, and respectively connected to two ends of a first direction of the bottom wall, each first direction side wall has two first extending portions, the first extending portions extend along the first direction;
a top cover component, comprising a top wall and two second direction side walls, the two second direction side walls are parallel to each other, and respectively connected to two ends of a second direction of the top wall, and respectively cover the first extending portions, wherein the second direction is perpendicular to the first direction, and the first direction and the second direction are parallel to the bottom wall and the top wall; and
a fan component, comprising a fan body and a plurality of fan connectors, the fan body is located in a space formed by clamping the base component and the top cover component, the plurality of fan connectors are respectively connected to the fan body and one of the first extending portions,
wherein the fan connector has two fan locking parts, the two fan locking parts are respectively parallel to the top wall and the first extending portion to respectively lock in the fan body and one of the first extending portions.

2. The power supply for a computer according to claim 1, wherein the top wall has a plurality of vent holes, and the fan body is adjacent to the top wall.

3. The power supply for a computer according to claim 1, further comprising an electrical connection interface disposed in one of the two first direction side walls.

4. The power supply for a computer according to claim 1, wherein the first direction sidewall has a plurality of vent holes.

5. The power supply for a computer according to claim 3, wherein the first direction sidewall has a plurality of vent holes.

6. The power supply for a computer according to claim 1, further comprising a circuit component, comprising a circuit board, a support plate, and a plurality of support plate connectors, the circuit board is locked to the support plate, the support plate connectors are respectively connected to the support plate and one of the first extending portions.

7. The power supply for a computer according to claim 6, wherein the support plate is provided with a plurality of nut posts, and the circuit board is locked to the support plate via the nut posts.

8. The power supply for a computer according to claim 6, wherein the support plate connectors are parallel to the first extending portion, and are respectively locked to the first extending portions.

* * * * *